United States Patent
Zeine et al.

(10) Patent No.: US 12,374,927 B2
(45) Date of Patent: Jul. 29, 2025

(54) SIMPLIFIED WIRELESS POWER RECEIVER ARCHITECTURE

(71) Applicant: Ossia Inc., Redmond, WA (US)

(72) Inventors: Hatem Ibrahim Zeine, Woodinville, WA (US); Douglas Wayne Williams, Bellevue, WA (US); James J. Wojcik, Prior Lake, MN (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 18/668,551

(22) Filed: May 20, 2024

(65) Prior Publication Data

US 2024/0305141 A1 Sep. 12, 2024

Related U.S. Application Data

(63) Continuation of application No. 18/052,422, filed on Nov. 3, 2022, now Pat. No. 11,990,770, which is a
(Continued)

(51) Int. Cl.
*H02J 50/20* (2016.01)
*H02J 7/00* (2006.01)
(Continued)

(52) U.S. Cl.
CPC ............ *H02J 50/20* (2016.02); *H02J 7/0047* (2013.01); *H02J 7/02* (2013.01); *H02J 7/345* (2013.01);
(Continued)

(58) Field of Classification Search
CPC .. H02J 50/001; H02J 7/345; H02J 7/02; H02J 50/40; H02J 7/0047; H02J 50/20; H02J 50/80
See application file for complete search history.

(56) References Cited

U.S. PATENT DOCUMENTS

| 6,958,677 B1 | 10/2005 | Carter |
| 9,942,788 B1 | 4/2018 | Zeine et al. |

(Continued)

FOREIGN PATENT DOCUMENTS

| CN | 105720638 A | 6/2016 |
| CN | 106953425 A | 7/2017 |

(Continued)

OTHER PUBLICATIONS

Korean Patent Application No. 2022-7014000, Notice of Allowance, 4 pages, Jun. 10, 2024.
(Continued)

*Primary Examiner* — Quan Tra
*Assistant Examiner* — Anh-Quan Tra

(57) ABSTRACT

Systems, methods, and apparatuses for receiving wireless power using a wireless power receiver client architecture are disclosed. A simplified wireless power receiver apparatus includes an energy storage device and a radio frequency (RF) transceiver including an antenna. Energy harvester circuitry is coupled to the energy storage device and the RF transceiver, and control circuitry is coupled to the energy storage device, the RF transceiver, and the energy harvester. The control circuitry causes the RF transceiver to: establish a connection with a wireless power transmitter (WPT), transmit a beacon signal to the WPT, and receive a wireless power signal from the WPT. The control circuitry causes the energy harvester to deliver at least a portion of energy of the wireless power signal to the energy storage device for storage therein. In some embodiments, a single antenna is utilized both for transmitting the beacon signal and for receiving the wireless power signal.

20 Claims, 13 Drawing Sheets

Related U.S. Application Data continuation of application No. 17/388,564, filed on Jul. 29, 2021, now Pat. No. 11,527,918, which is a continuation of application No. 16/845,942, filed on Apr. 10, 2020, now Pat. No. 11,101,701.

(60) Provisional application No. 62/832,185, filed on Apr. 10, 2019.

(51) Int. Cl.
| | |
|---|---|
| *H02J 7/02* | (2016.01) |
| *H02J 7/34* | (2006.01) |
| *H02J 50/00* | (2016.01) |
| *H02J 50/40* | (2016.01) |
| *H02J 50/80* | (2016.01) |

(52) U.S. Cl.
CPC ............ *H02J 50/001* (2020.01); *H02J 50/40* (2016.02); *H02J 50/80* (2016.02)

(56) References Cited

U.S. PATENT DOCUMENTS

| | | |
|---|---|---|
| 2007/0109121 A1 | 5/2007 | Cohen |
| 2010/0033021 A1 | 2/2010 | Bennett |
| 2010/0034238 A1 | 2/2010 | Bennett |
| 2010/0259447 A1 | 10/2010 | Crouch |
| 2010/0289341 A1 | 11/2010 | Ozaki et al. |
| 2011/0115431 A1 | 5/2011 | Dunworth et al. |
| 2012/0004008 A1 | 1/2012 | Sakata et al. |
| 2012/0274154 A1 | 11/2012 | DeLuca |
| 2012/0316414 A1 | 12/2012 | Greene |
| 2013/0058379 A1 | 3/2013 | Kim et al. |
| 2013/0234536 A1 | 9/2013 | Chemishkian et al. |
| 2015/0229133 A1 | 8/2015 | Reynolds et al. |
| 2015/0303741 A1 | 10/2015 | Malik et al. |
| 2016/0301264 A1* | 10/2016 | Zeine ....................... H02J 50/80 |
| 2016/0359377 A1 | 12/2016 | Zeine et al. |
| 2017/0005531 A1 | 1/2017 | Zeine et al. |
| 2017/0063156 A1 | 3/2017 | Williams et al. |
| 2017/0110910 A1 | 4/2017 | Zeine et al. |
| 2017/0141585 A1 | 5/2017 | Walley et al. |
| 2017/0208597 A1 | 7/2017 | Gollakota et al. |
| 2018/0049100 A1 | 2/2018 | Tenny et al. |
| 2018/0062451 A1 | 3/2018 | Rajapaksa |
| 2018/0138754 A1 | 5/2018 | Feki et al. |
| 2018/0269925 A1 | 9/2018 | Matsuo |
| 2018/0287418 A1 | 10/2018 | Zeine et al. |
| 2018/0287429 A1 | 10/2018 | Yamamoto |
| 2018/0295557 A1* | 10/2018 | Zeine ....................... H04B 7/04 |
| 2018/0338252 A1 | 11/2018 | Zeine et al. |
| 2018/0366085 A1 | 12/2018 | Zeine et al. |
| 2018/0366989 A1 | 12/2018 | Lee et al. |
| 2019/0027856 A1 | 1/2019 | Peloza et al. |
| 2019/0184842 A1 | 6/2019 | Waters |
| 2019/0348853 A1 | 11/2019 | Swan |

FOREIGN PATENT DOCUMENTS

| | | |
|---|---|---|
| CN | 107302848 A | 10/2017 |
| CN | 108604738 A | 9/2018 |
| GB | 2528911 A | 2/2016 |
| JP | 2010-530210 A | 9/2010 |
| JP | 2010-226440 A | 10/2010 |
| JP | 2012-517792 A | 8/2012 |
| JP | 2012-530482 A | 11/2012 |
| JP | 2013-59046 A | 3/2013 |
| JP | 2013-511908 A | 4/2013 |
| JP | 2013-511954 A | 4/2013 |
| JP | 2013-511955 A | 4/2013 |
| JP | 2013-511956 A | 4/2013 |
| JP | 2018-501755 A | 1/2018 |
| JP | 2018-514177 A | 5/2018 |
| JP | 2018-514178 A | 5/2018 |
| JP | 2018-516041 A | 6/2018 |
| JP | 2018-521301 A | 8/2018 |
| JP | 2018-521618 A | 8/2018 |
| JP | 2018-523451 A | 8/2018 |
| JP | 2018-523453 A | 8/2018 |
| JP | 2019-508999 A | 3/2019 |
| JP | 2021-502791 A | 1/2021 |
| JP | 2022-516412 A | 2/2022 |
| KR | 2011-0135540 A | 12/2011 |
| WO | 2015/199442 A1 | 12/2015 |
| WO | 2016/020645 A1 | 2/2016 |

OTHER PUBLICATIONS

Chinese Patent Application No. 202080027503.1, Office Action, 7 pages, Feb. 16, 2022.
Cost Action IC1301 Team, "Europe And The Future For WPT," IEEE Microwave Magazine, 32 pages, Jun. 2017.
European Patent Application No. 20787578.2, Extended European Search Report, 8 pages, Jan. 18, 2023.
International Application No. PCT/US2020/027669, International Search Report, Written Opinion, 13 pages, Jul. 24, 2020.
Japanese Patent Application No. 2021-559852, Notice of Allowance, May 10, 2022.
Japanese Patent Application No. 2022-092695, Notice of Allowance, 5 pages, Sep. 5, 2023.
Korean Patent Application No. 2021-7032256, Notice of Allowance, 4 pages, Jan. 27, 2022.

* cited by examiner

SIMPLIFIED WIRELESS POWER RECEIVER ARCHITECTURE

CROSS-REFERENCE TO RELATED APPLICATIONS

This application is a continuation of U.S. patent application Ser. No. 18/052,422, filed Nov. 3, 2022 and now allowed; which is a continuation of U.S. patent application Ser. No. 17/388,564, filed Jul. 29, 2021, and issued as U.S. Pat. No. 11,527,918 on Dec. 13, 2022; which is a continuation of U.S. patent application Ser. No. 16/845,942, filed Apr. 10, 2020 and issued as U.S. Pat. No. 11,101,701 on Aug. 24, 2021; which claims priority to U.S. Provisional Patent Application No. 62/832,185, filed Apr. 10, 2019; all of which are incorporated herein by reference in their entireties.

BACKGROUND

Many portable electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not conveniently co-located. It would, therefore, be desirable to derive recharging battery power for a client device battery from electromagnetic (EM) radiation.

Power receivers have traditionally required side channel communication for power delivery. This side channel was traditionally an IEEE 802.15.4 radio used for registering power receivers, coordinating power delivery timing, and communicating receiver status. The inclusion of this radio increases costs, and the radio itself may be redundant with other radios in the target device (such as BLUETOOTH LOW ENERGY (BLE) or WI-FI).

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

This application is related to, and references, U.S. patent application Ser. No. 15/852,216 titled as "Anytime Beaconing in a Wireless Power Transmission System" and Ser. No. 16/244,013 titled "Timing Acquisition Module For Wireless Power Transmission", both of which are incorporated herein in their entireties.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
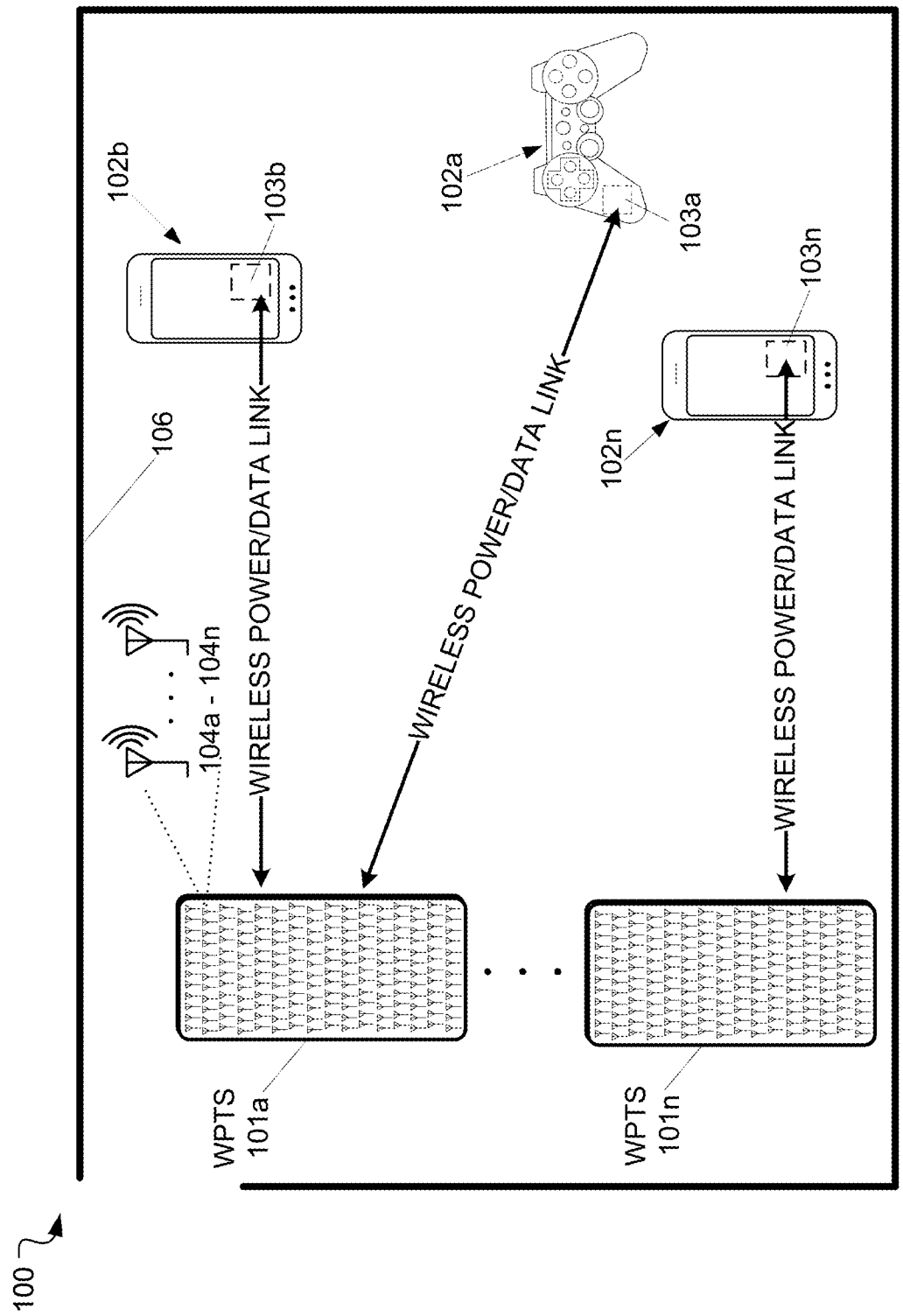
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

This present disclosure describes systems, methods, and apparatuses for receiving wireless power using a wireless power receiver client architecture are disclosed. A simplified wireless power receiver apparatus includes an energy storage device and a radio frequency (RF) transceiver including an antenna. Energy harvester circuitry is coupled to the energy storage device and the RF transceiver, and control circuitry is coupled to the energy storage device, the RF transceiver, and the energy harvester. The control circuitry causes the RF transceiver to: establish a connection with a wireless power transmitter (WPT), transmit a beacon signal to the WPT, and receive a wireless power signal from the WPT. The control circuitry causes the energy harvester to deliver at least a portion of energy of the wireless power signal to the energy storage device for storage therein. In some embodiments, a single antenna is utilized both for transmitting the beacon signal and for receiving the wireless power signal.

In embodiments of the present technology, the disclosed method for wireless power delivery can be accomplished in the absence of any side channel communication. This is accomplished by passing basic information (ID, general status, etc.) from the wireless power receiver client to the WPT using the beacon signal. According to the disclosed embodiments, direct WPT-to-wireless power receiver communication in known systems and methods has been substituted by systems, methods and apparatuses for signaling using the duration of the power signal to prompt different data to be embedded and encoded in the beacon signal by the disclosed simplified wireless power receiver client. This allows creation of, for instance, a COTA-associated wireless power receiver client without a dedicated radio for communication, thereby simplifying the design while also reducing component complexity and cost, and decreasing associated power consumption. Examples of practical applications of the disclosed embodiments of the present technology include, for example, and without limitation: electronic shelf labeling (ESL) and other low-power Internet-of-things (IoT) applications where the inclusion of a separate radio presents a significant burden on system design/cost. Embodiments of the present technology advantageously provide lower wireless power receiver client cost and complexity and compared to known systems that require a dedicated radio. In addition to, or instead of, the disclosed simplified wireless power receiver client embedding and encoding different data in the beacon signal according to the power signal duration, in some embodiments, that duration can prompt the disclosed wireless power receiver client to shift its beacon frequency such that the entire system (e.g., both the receiver and the transmitter) can occupy a new channel for wireless power transmission.

FIG. 1 depicts a block diagram including an example wireless power delivery environment 100 illustrating wireless power delivery from one or more wireless power transmission systems (WPTS) 101a-n (also referred to as "wireless power delivery systems", "antenna array systems" and "wireless chargers") to various wireless devices 102a-n within the wireless power delivery environment 100, according to some embodiments. More specifically, FIG. 1 illustrates an example wireless power delivery environment 100 in which wireless power and/or data can be delivered to available wireless devices 102a-102n having one or more wireless power receiver clients 103a-103n (also referred to herein as "clients" and "wireless power receivers"). The wireless power receiver clients are configured to receive and process wireless power from one or more wireless power transmission systems 101a-101n. Components of an example wireless power receiver client 103 implementing aspects of the disclosed simplified wireless power receiver client are shown and discussed in greater detail with reference to FIGS. 4A-4E.

As shown in the example of FIG. 1, the wireless devices 102a-102n include mobile phone devices and a wireless game controller. However, the wireless devices 102a-102n can be any device or system that needs power and is capable of receiving wireless power via one or more integrated wireless power receiver clients 103a-103n. As discussed herein, the one or more integrated wireless power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102a-102n. In some embodiments, the antennas are adaptively-phased RF antennas. The wireless power transmission system 101 is capable of determining the appropriate phases with which to deliver a coherent power transmission signal to the wireless power receiver clients 103a-103n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more wireless power receiver clients 103. As illustrated in the example of FIG. 1, power delivery antennas 104a-104n are shown. The power delivery antennas 104a are configured to provide delivery of wireless radio frequency (RF) power in the wireless power delivery environment. In some embodiments, one or more of the power delivery antennas 104a-104n can alternatively or additionally be configured for data communications in addition to, or in lieu of, wireless power delivery. The one or more data communication antennas are configured to send data communications to and receive data communications from the wireless power receiver clients 103a-103n and/or the wireless devices 102a-102n. In some embodiments, the data communication antennas can communicate via BLUETOOTH, WI-FI, ZIGBEE, etc. Other data communication protocols are also possible.

Each wireless power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each of the wireless power transmission systems 101a-101n is capable of determining the appropriate phases for delivering the coherent signals to the wireless power receiver clients 102a-102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary AC power supply in a building. Alternatively, or additionally, one or more of the wireless power transmission systems 101a-101n can be powered by a battery or via other mechanisms, e.g., solar cells, etc.

The wireless power receiver clients 102a-102n and/or the wireless power transmission systems 101a-101n are configured to operate in a multipath wireless power delivery environment. That is, the wireless power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the wireless power receiver clients 103a-103n.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a BLACKBERRY device, a TREO, and/or an IPHONE, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the wireless power receiver clients 103a-103n can each include a data communication module for communication via a data channel. Alternatively, or additionally, the wireless power receiver clients 103a-103n can direct the wireless devices 102a-102n to communicate with the wireless power transmission system via existing data communications modules. In some embodiments, the beacon signal, which is primarily referred to herein as a continuous waveform, can alternatively or additionally take the form of a modulated signal.

Figure 2:
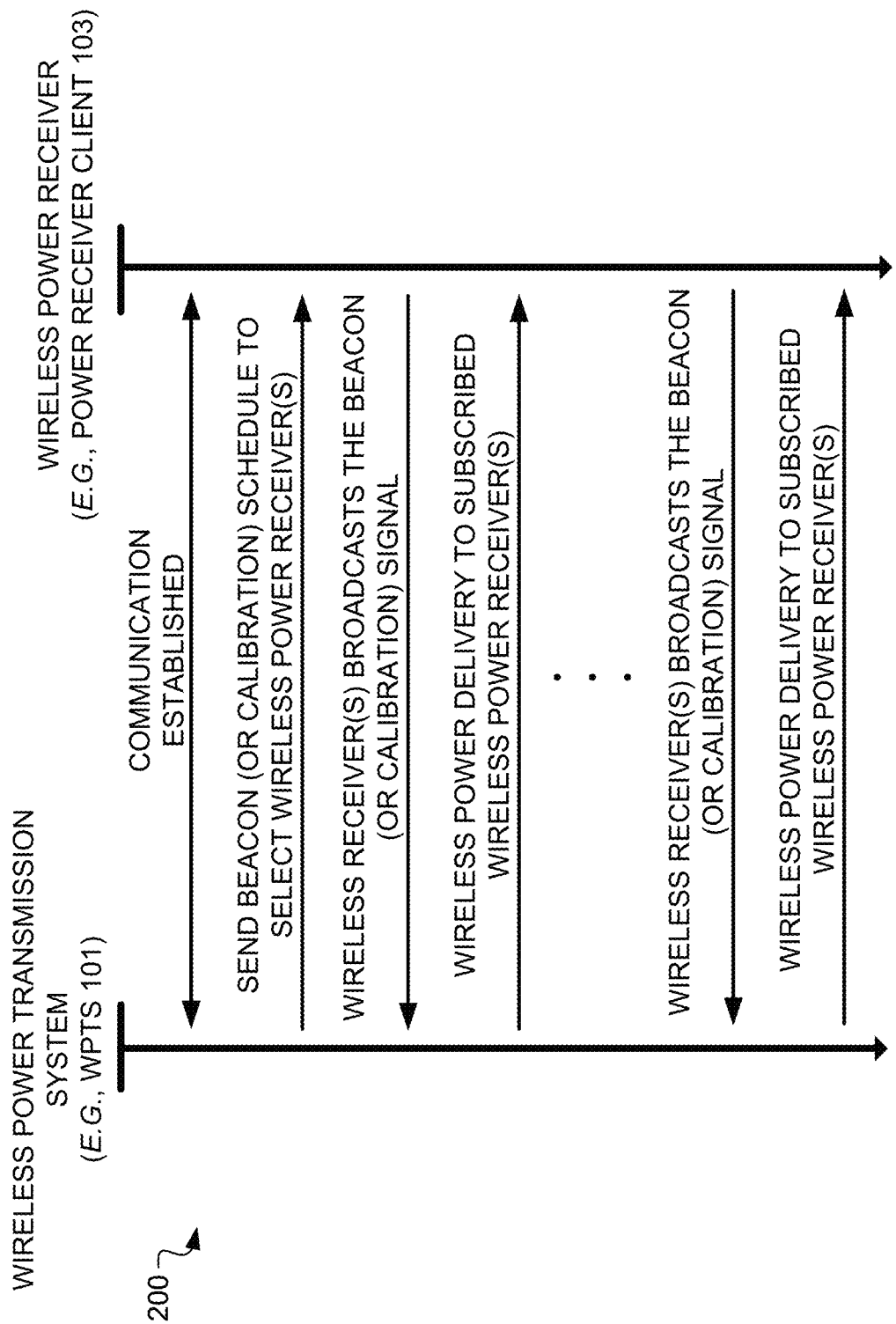
FIG. 2 depicts a sequence diagram illustrating example operations between a wireless power transmission system and a wireless power receiver client for commencing wireless power delivery in accordance with some embodiments.

FIG. 2 depicts a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., beacon beat schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select wireless power receiver clients 103. The wireless power transmission system 101 can also send power transmission scheduling information so that the wireless power receiver client 103 knows when to expect (e.g., a window of time) wireless power from the wireless power transmission system. The wireless power receiver client 103 then generates a beacon (or calibration) signal and broadcasts the beacon during an assigned beacon transmission window (or time slice) indicated by the beacon schedule information, e.g., BBS cycle. As discussed herein, the wireless power receiver client 103 includes one or more antennas (or transceivers) which have a radiation and reception pattern in three-dimensional space proximate to the wireless device 102 in which the wireless power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the wireless power receiver client 103 via the same path over which the beacon signal was received from the wireless power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from one or more antennas in such a way as to create an aggregate signal from the one or more of the antennas that approximately recreates the waveform of the beacon in the opposite direction. Said another way, the wireless power transmission system 101 can deliver wireless RF power to the wireless power receiver clients via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client 103 at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery using the disclosed simplified wireless power receiver client is described below with reference to FIGS. 4A-4E.

Figure 3:
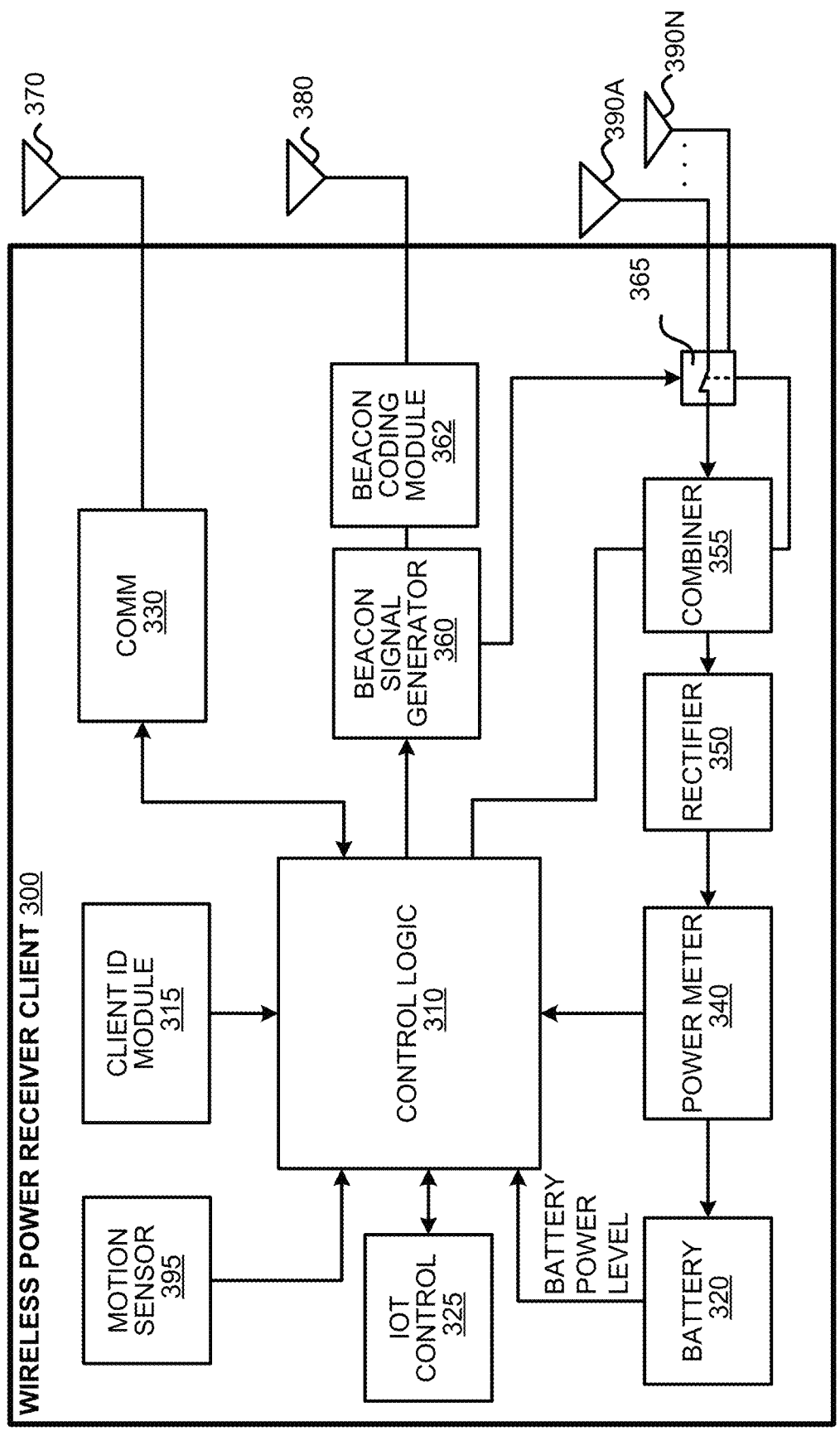
FIG. 3 depicts a block diagram illustrating example components of a known wireless power receiver client.

FIG. 3 is a block diagram illustrating example components of a known wireless power receiver client 300. As illustrated in the example of FIG. 3, the receiver 300 includes control logic 310, battery 320, an IoT control module 325, communication block 330 and associated antenna 370, power meter 340, rectifier 350, a combiner 355, beacon signal generator 360, beacon coding unit 362 and an associated antenna 380, and switch 365 connecting the rectifier 350 or the beacon signal generator 360 to one or more associated antennas 390a-n. Some or all of the components can be omitted in some embodiments. In some examples, the wireless power receiver client 300 does not include its own antennas but instead utilizes and/or otherwise shares one or more antennas (e.g., WI-FI antenna) of the wireless device in which the wireless power receiver client is embedded. Moreover, in some examples, the wireless power receiver client 300 may include a single antenna that provides data transmission functionality as well as power/data reception functionality. Additional components are also possible.

A combiner 355 receives and combines the received power transmission signals from the power transmitter in the event that the receiver 300 has more than one antenna. The combiner can be any combiner or divider circuit that is configured to achieve isolation between the output ports while maintaining a matched condition. For example, the combiner 355 can be a Wilkinson power divider circuit. The rectifier 350 receives the combined power transmission signal from the combiner 355, if present, which is fed through the power meter 340 to the battery 320 for charging. In other examples, each antenna's power path can have its own rectifier 350 and the DC power out of the rectifiers is combined prior to feeding the power meter 340. The power meter 340 can measure the received power signal strength and provides the control logic 310 with this measurement.

Battery 320 can include protection circuitry and/or monitoring functions. Additionally, the battery 320 can include one or more features, including, but not limited to, current limiting, temperature protection, over/under voltage alerts and protection, and coulomb monitoring.

The control logic 310 receives and processes the battery power level from the battery 320 itself. The control logic 310 may also transmit/receive via the communication block 330 a data signal on a data carrier frequency, such as the base signal clock for clock synchronization. The beacon signal generator 360 generates the beacon signal, or calibration signal, transmits the beacon signal using either the antenna 380 or 390 after the beacon signal is encoded.

It may be noted that, although the battery 320 is shown as charged by, and providing power to, the wireless power receiver client 300, the receiver may also receive its power directly from the rectifier 350. This may be in addition to the rectifier 350 providing charging current to the battery 320, or in lieu of providing charging. Also, it may be noted that the use of multiple antennas is one example of implementation and the structure may be reduced to one shared antenna.

In some embodiments, the control logic 310 and/or the IoT control module 325 can communicate with and/or otherwise derive IoT information from the device in which the wireless power receiver client 300 is embedded. Although not shown, in some examples, the wireless power receiver client 300 can have one or more data connections (wired or wireless) with the device in which the wireless power receiver client 300 is embedded over which IoT information can be obtained. Alternatively, or additionally, IoT information can be determined and/or inferred by the wireless power receiver client 300, e.g., via one or more sensors. As discussed above, the IoT information can include, but is not limited to, information about the capabilities of the device in which the wireless power receiver client 300 is embedded, usage information of the device in which the wireless power receiver client 300 is embedded, power levels of the battery or batteries of the device in which the wireless power receiver client 300 is embedded, and/or information obtained or inferred by the device in which the wireless power receiver client is embedded or the wireless power receiver client itself, e.g., via sensors, etc.

In some examples, a client identifier (ID) module 315 stores a client ID that can uniquely identify the wireless power receiver client 300 in a wireless power delivery environment. For example, the ID can be transmitted to one or more wireless power transmission systems when communication is established. In some examples, wireless power receiver clients may also be able to receive and identify other wireless power receiver clients in a wireless power delivery environment based on the client ID.

An optional motion sensor 395 can detect motion and signal the control logic 310 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some examples, when a device is used in a moving environment like a car, train or plane, the power might only be transmitted intermittently or at a reduced level unless the device is critically low on power.

Figure 4A:
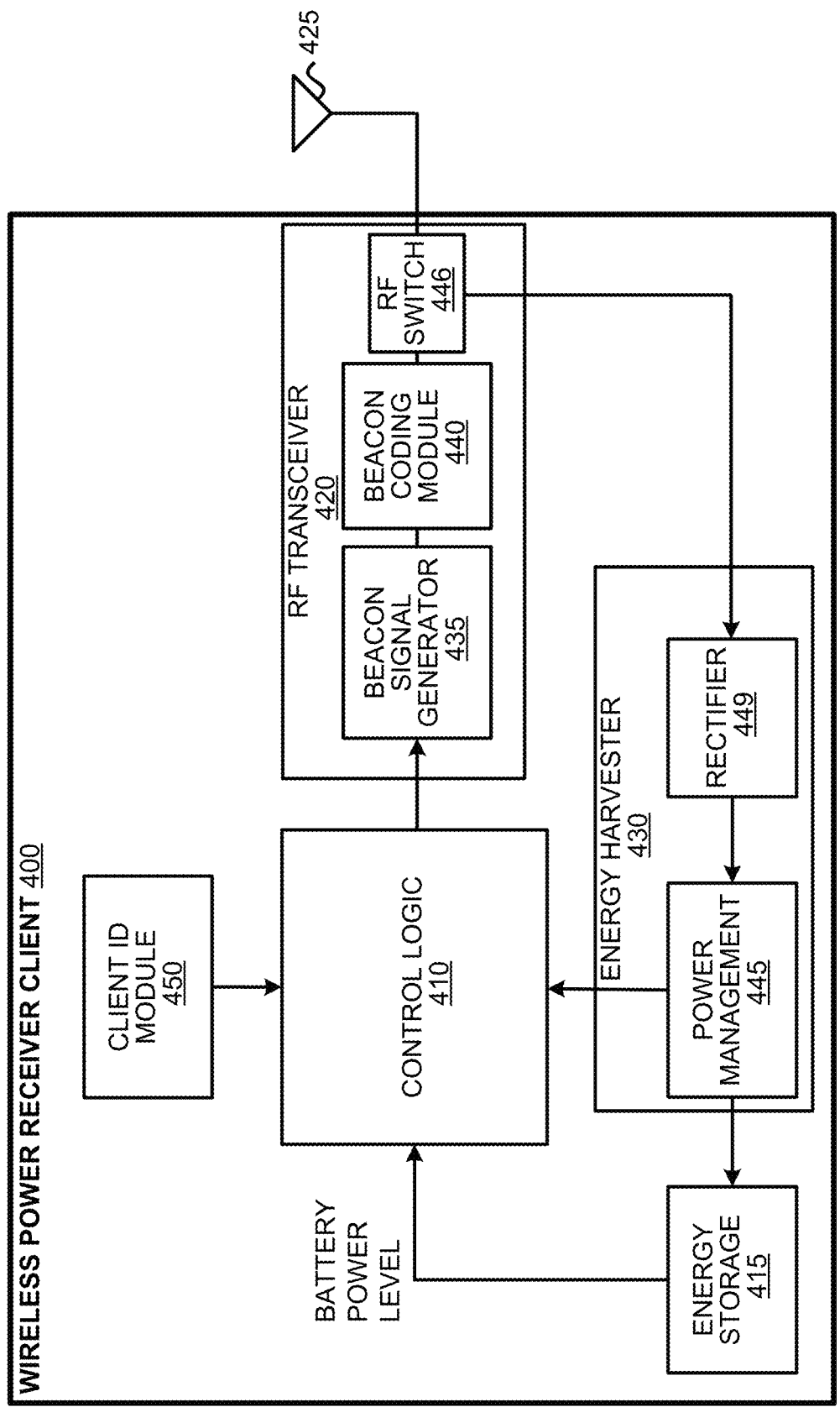
FIG. 4A depicts a block diagram illustrating example components of a simplified wireless power receiver client in accordance with some embodiments.
Figure 4B:
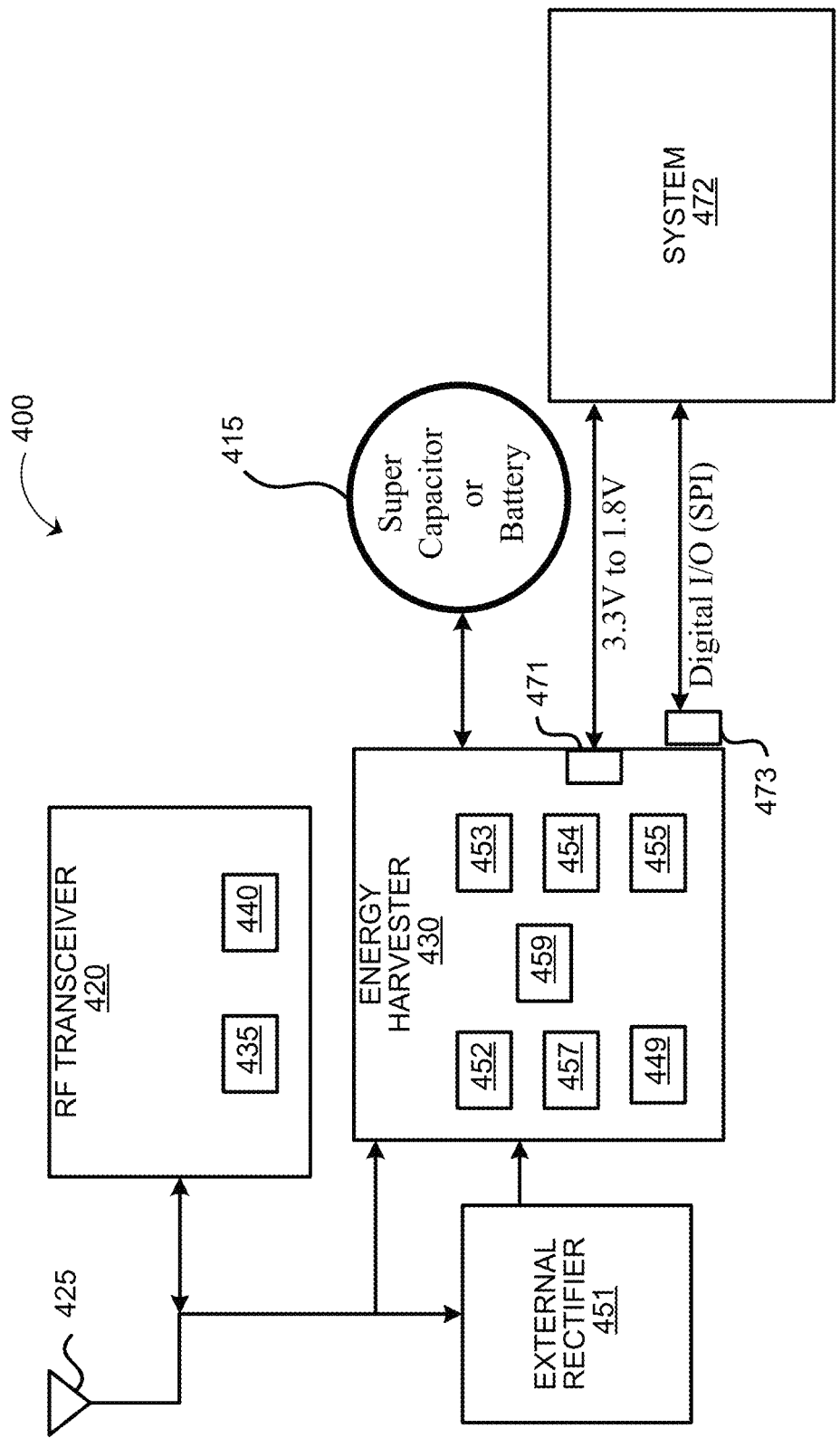
FIG. 4B depicts a block diagram illustrating an example implementation of FIG. 4A in accordance with some embodiments.
Figure 4C:
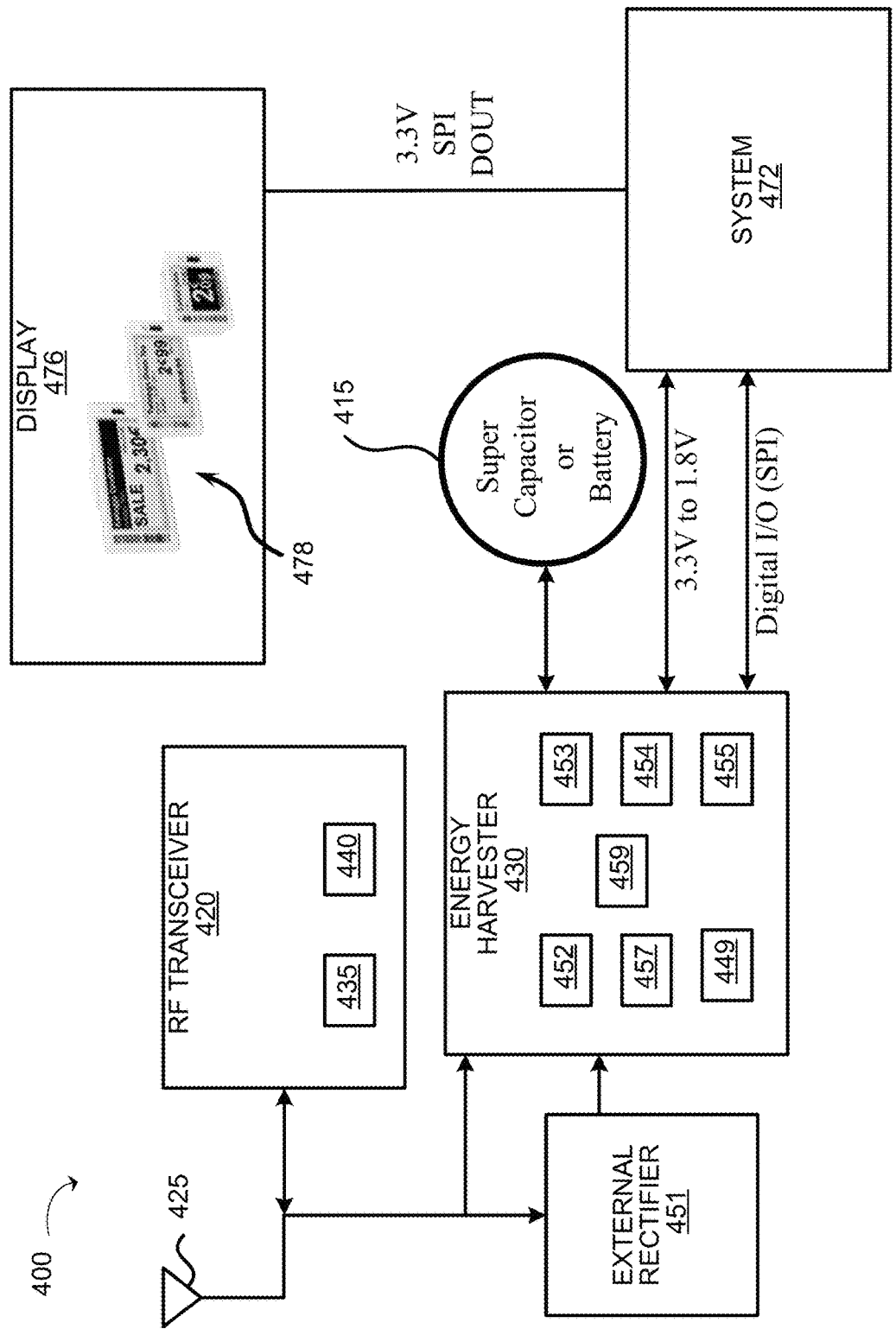
FIG. 4C depicts a block diagram of an example implementation of FIG. 4A for an electronic shelf label (ESL) application in accordance with some embodiments.
Figure 4D:
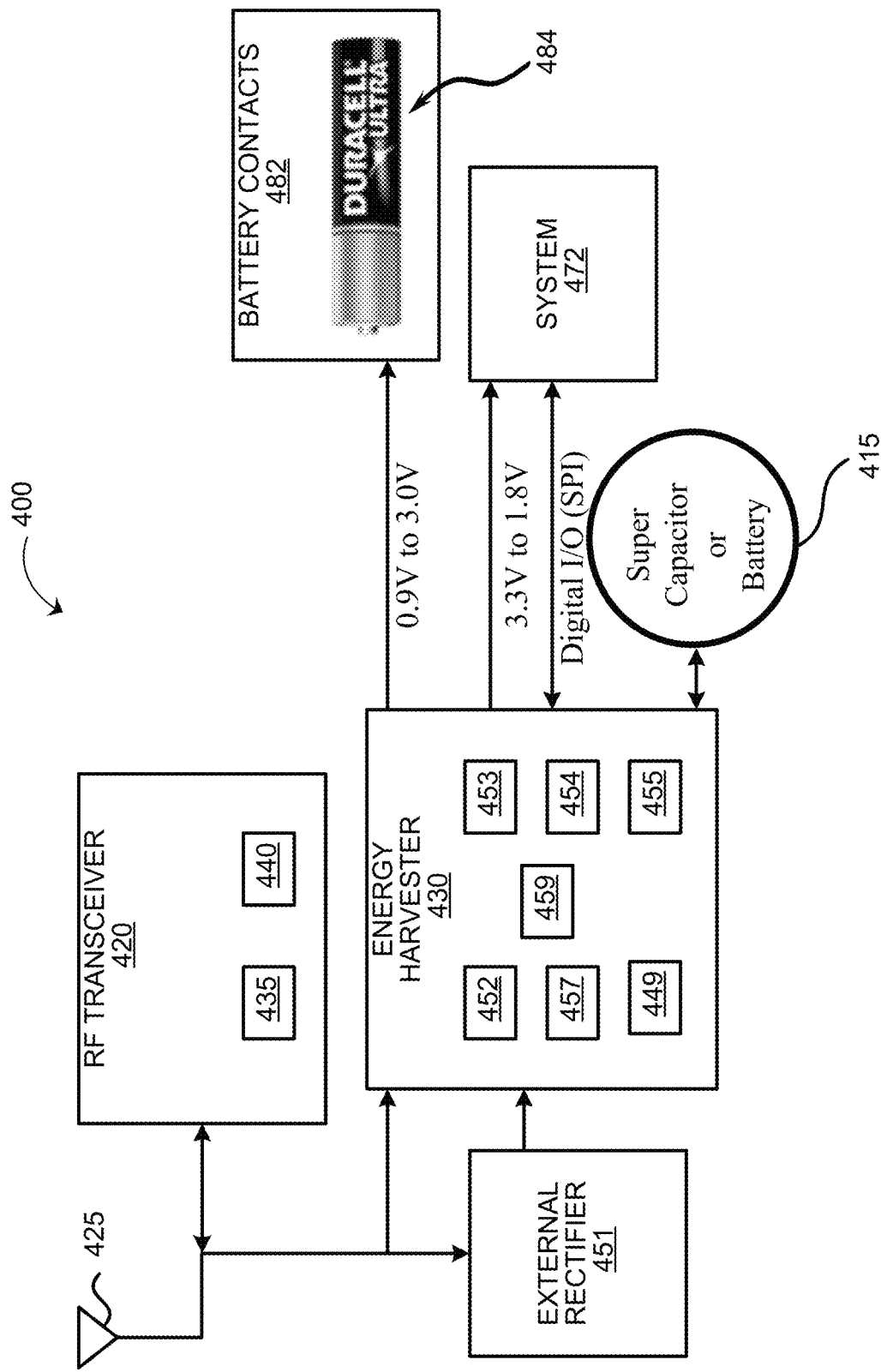
FIG. 4D depicts a block diagram of an example implementation of FIG. 4A for a traditional AA or AAA battery application in accordance with some embodiments.
Figure 4E:
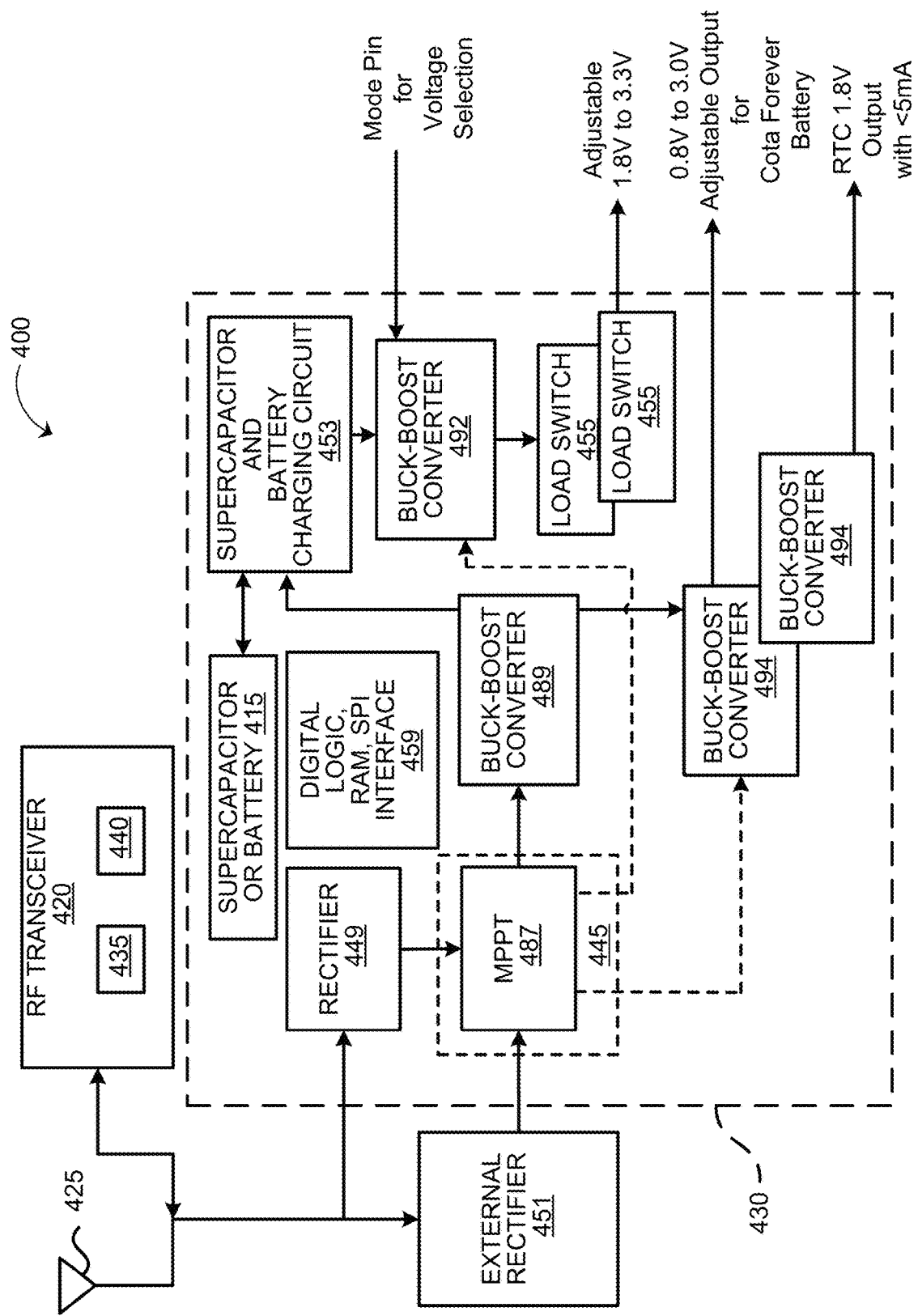
FIG. 4E depicts a block diagram of an example implementation of FIG. 4A with a different power source in accordance with some embodiments.

FIG. 4A depicts a block diagram illustrating example components of a simplified wireless power receiver client 400 in accordance with some embodiments. FIG. 4B depicts a block diagram illustrating an example implementation of the simplified wireless power receiver client 400 of FIG. 4A in accordance with some embodiments. FIG. 4C depicts a block diagram of an example implementation of the simplified wireless power receiver client 400 of FIG. 4A for an ESL application in accordance with some embodiments. FIG. 4D depicts a block diagram of an example implementation of the simplified wireless power receiver client 400 of FIG. 4A for a traditional AA or AAA battery application in accordance with some embodiments. FIG. 4E depicts a block diagram of an example implementation of the simplified wireless power receiver client 400 of FIG. 4A with a different power source in accordance with some embodiments.

As compared to the known wireless power receiver client 300 of FIG. 3, the simplified wireless receiver client 400 of FIG. 4A does not include the dedicated comm radio block 330. Instead, the simplified wireless receiver client 400 of FIG. 4A utilizes a beacon coding module 440 for uplink and uses control logic 410 for measurement of power signal duration. This further provides simpler downlink signaling as compared to the known wireless power receiver client 300.

Referring to FIG. 4A, the simplified wireless power receiver client 400 includes control logic 410, an energy storage device 415 (e.g., a battery), an RF transceiver block 420 and at least one associated antenna 425, and an energy harvester block 430. The RF transceiver 420 can include beacon signal generator 435 in communication with a beacon coding module 440. The beacon coding module 440 can be coupled to antenna 425. The energy harvester 430 can include a power management block 445 coupled to a rectifier 449. The rectifier 449 can be coupled to the antenna 425. The power management block 445 can be coupled to the energy storage device 415 and to the control logic 410. The energy storage device 415 can be coupled to the control logic 410. Control logic 410, energy harvester block 430, beacon signal generator 435, beacon coding module 440, and power management module 445 can each include one or more analog and/or digital electronic components configured to perform, implement or otherwise facilitate operation of the present technology according to the disclosed embodiments.

Some or all of the components can be omitted in some embodiments. In some embodiments, the wireless power receiver client 400 does not include its own antenna(s) but instead utilizes and/or otherwise shares one or more antennas (e.g., WI-FI antenna) of the wireless device in which the wireless power receiver client 400 is embedded. Moreover, in some embodiments, the wireless power receiver client 400 may include a single antenna that provides data transmission functionality as well as power/data reception functionality. Additional components are also possible.

RF transceiver 420 can receive power transmission signals from the power transmitter via antenna(s) 425. As described in greater detail by way of examples, below, the power transmission signals can be routed from RF transceiver 420 to the rectifier 449 of energy harvester 430. In an example, the power transmission signals can be routed from RF transceiver 420 to rectifier 449 using an integrated RF switch 446. The rectifier 449 can receive the time varying (e.g., sinusoidal) power transmission signal from the RF transceiver 420 and rectify it. A rectified power transmission signal can be passed from rectifier 449 to the power management block 445 of energy harvester 430. Power management block 445 provides electric power to the energy storage device 415 for charging. Additionally, rectified power can be provided to control logic 410 via power management block 445, as shown in FIG. 4A.

Energy storage device 415 (e.g., battery or supercapacitor) can include protection circuitry and/or monitoring functions. Additionally, the energy storage device 415 can include one or more features, including, but not limited to, current limiting, temperature protection, over/under voltage alerts and protection, and coulomb monitoring.

The control logic 410 receives and processes the battery power level from the energy storage device 415 itself. The control logic 410 may also cause RF transceiver 420 to transmit, e.g., via the RF transceiver 420, a data signal on a data carrier frequency. The beacon signal generator 435 can generate the beacon signal, or calibration signal, and transmit the beacon signal using antenna 425 after the beacon signal is encoded by beacon coding module 440. In some embodiments, the control logic 410 can measure the duration of the wireless RF power signal for signaling purposes. As described below in greater detail with reference to FIGS. 6 and 7, the duration of the power signal may be used to control the client discovery process in the wireless power transmission environment. In an example, the measured duration may be used for signaling purposes to control, according to the measured duration, the communication (e.g., receiving) behavior of the RF transceiver 420 and/or at least one antenna 425. In another example, the measured duration may be used to control processing actions of, for example, power management module 445 and/or control logic 410. Examples of such control of communication and/or processing may include triggering the wireless power receiver client 400 to send a long ID in a next beacon, setting a frequency of the beacon, and transmitting an energy storage device 415 (e.g., battery) state in the next beacon, among other actions. In addition to, or instead of, the disclosed simplified wireless power receiver client embedding and encoding different data in the beacon signal according to the power signal duration, in some embodiments, that duration can prompt the disclosed wireless power receiver client to shift its beacon frequency such that the entire system (e.g., both the receiver and the transmitter) can occupy a new channel for wireless power transmission.

It may be noted that, although the energy storage device 415 (e.g., battery) is shown as charged by, and providing power to, the wireless power receiver client 400, the receiver may also receive its power directly from the rectifier 449 including, for example and without limitation, via power management block 445. This may be in addition to the rectifier 449 providing charging current to the energy storage device 415, or in lieu of providing charging. Also, it may be noted that the use of multiple antennas is one embodiment (not shown in FIG. 4A) may be reduced to one shared antenna 425, as shown in FIG. 4A.

In some embodiments, the control logic 410 can communicate with and/or otherwise derive IoT information from the device in which the wireless power receiver client 400 is embedded. Although not shown in FIG. 4A, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors (not shown in FIG. 4A). As discussed above, the IoT information can include, but is not limited to, information about the capabilities of the device in which the wireless power receiver client 400 is embedded, usage information of the device in which the wireless power receiver client 400 is embedded, power levels of the battery or batteries of the device in which the wireless power receiver client 400 is embedded, and/or information obtained or inferred by the device in which the wireless power receiver client 400 is embedded or the wireless power receiver client 400 itself, e.g., via sensors, etc.

In some embodiments, a client identifier (ID) module 450 stores a client ID that can uniquely identify the wireless power receiver client 400 in a wireless power delivery environment. For example, the beacon-encoded message can be used to pass the client ID to one or more wireless power transmission systems. In some embodiments, wireless power receiver client 400 can include an IoT radio (not shown in FIG. 4A) to provide added functionality to the wireless power receiver client 400 such that it can be made aware of client ID(s) of other devices.

Referring to the wireless power receiver client 400 of FIG. 4B, energy storage device 415 can be embodied in a super capacitor or a battery (e.g., lithium-ion) coupled to energy harvester 430 for receiving rectified electric power for charging. The wireless power receiver client 400 of FIG. 4B can include an external rectifier 451 coupled to antenna 425 and energy harvester 430. In any of the embodiments shown in FIGS. 4A-4E, energy harvester 430 can include, in addition to power management module 445 and internal rectifier 449, a cold start module 452, separate or integrated charging circuit(s) 453 for charging the supercapacitor- or battery-type energy storage device 415, one or more power supplies 454, one or more load switches 455, an external rectifier support block 457, and a digital logic, RAM and communications (e.g., SPI) interface 459. In an example, energy harvester 430 can utilize subsystems such as one or more of power supplies 454, load switches 455, external rectifier support block 457, and internal rectifier 449 to provide power in the range of, for example, 1.8V-3.3V, output to, for instance, components in need thereof in the device in which the wireless power receiver client 400 is embedded. The wireless power receiver client 400 can include a means for interfacing the energy harvester 430 coupled to the internal rectifier to facilitate delivering a flow of electric current to one or more electronic components of a client device or system associated with the wireless power receiver client 400. In an example, the means for interfacing the energy harvester 430 is or includes at least one electrical connector 471.

In the illustrated embodiment, a customer-specific system 472 is coupled to energy harvester 430. System 472 can receive electric power for its operation from energy harvester 430 (e.g., at 1.8V-3.3V). System 472 can include a microcontroller, a radio, and like electronic subsystems of the device in which the wireless power receiver client 400 is embedded. For example, energy harvester 430 can transmit and receive digital I/O signals using, for example and without limitation, a serial peripheral interface (SPI) protocol. The wireless power receiver client 400 can include a data interfacing means coupled to at least one of: the energy harvester 430, and the control logic 410 to facilitate transmitting and/or receiving data signal(s) to or from one or more electronic devices of a client device or system (e.g., system 472) associated with the wireless power receiver client 400. In an example, the data interfacing means is or includes at least one data communication connector 473.

The wireless power receiver client 400 of FIG. 4C includes all the components and functionality (with the exception of system 472) as shown and described above with respect to FIG. 4B. In the example of FIG. 4C, the customer-specific system 472 coupled to energy harvester 430 can include an RF transceiver (e.g., other than transceiver 420) based in, for instance, at least one of a BLE, a ZIGBEE, and a custom RF component, for transmitting and/or receiving wirelessly encoded signals at frequencies such as 2.4 GHz, 900 MHz, or 5.8 GHz. In an example, the system 472 of FIG. 4C can output a SPI data out (DOUT) signal at, for instance, 3.3V, to one or more e-ink displays 476. In a use case, as shown in FIG. 4C, e-ink display(s) 476 are embodied in a plurality of grocery store shelf price and related product information ESL labels 478 having alphanumerical information that can be remotely set using system 472 and the simplified wireless power receiver client 400, as described herein.

The wireless power receiver client 400 of FIG. 4D includes all the components and functionality (including as described for system 472) as shown and described above with respect to FIG. 4B. Additionally, in the example of FIG. 4D, energy harvester 430 can utilize subsystems such as one or more of power supplies 454, load switches 455, external rectifier support block 457, and internal rectifier 449 to provide power in the range of, for example, 0.9V-3.0V, output to, for instance, battery contacts 482 of a battery (e.g., a rechargeable standard-sized AA battery 484) of the device in which the wireless power receiver client 400 is embedded. In the illustrated embodiment, battery contacts 482 are coupled to energy harvester 430 for receiving electric power for its operation from energy harvester 430 (e.g., at 0.9V-3.0V).

The illustrated wireless power receiver client 400 of FIG. 4E embodiment includes all the components and functionality as shown and described above with respect to FIG. 4B. Additionally, in the example of FIG. 4E, energy harvester 430 includes a maximum power point tracking (MPPT) block 487, and first 489, second 492 and third 494 buck-boost DC-to-DC power converters, or multiple instances thereof. MPPT block 487 can be coupled to the internal 449 and external 451 rectifiers for receiving rectified electric power therefrom after power transmission signals are received via antenna 425. In some embodiments, MPPT block 487 is included in the power management module 445 (not shown in FIG. 4E). In other embodiments, MPPT block 487 can be a separate component, or can replace power management module 445, in energy harvester 430.

First buck-boost converter(s) 489 can be coupled to MPPT block 487 for receiving DC power that can be maximized by power extraction from wireless power signals by energy harvester 430 under all conditions. First converter(s) 489 can supply electric power to charging circuit(s) 453 for purposes of charging the energy storage device 415. Second buck-boost converter(s) 492 can be coupled to charging circuit(s) 453. The one or more load switches 455 can receive electric power from second converter(s) 492 to provide adjustable power in the range of, for example, 1.8V-3.3V, output to, for instance, components in need thereof in the device in which the wireless power receiver client 400 is embedded. In an example, second converter(s) 492 interface with one or more means for selecting the voltage(s) at which second converter(s) 492 output electric power to the load switch(es) 455. In some embodiments, the means for selecting the voltage(s) include mode pins.

First buck-boost converter(s) 489 can be further coupled to third buck-boost converter(s) 494. In an example, one or more of the third converter(s) 494 provide adjustable power in the range of, for example, 0.8V-3.0V, output to one or more OSSIA COTA FOREVER batteries. In another example, one or more third converter(s) 494 provide electric power at a constant voltage of, for example, 1.8V, output at, for instance, <5 mA to a real-time clock (RTC) of CPU or related components in the device in which the wireless power receiver client 400 is embedded.

In some embodiments, second 492 and/or third 494 power converter(s) can be coupled directly to (denoted by dashed lines in FIG. 4E) and receive a flow of electric power from MPPT block 487, either instead of, or in addition to, being connected to MPPT block 487 by way of the solid line connections shown in FIG. 4E. A person having ordinary skill in the art will recognize and appreciate that any of the example embodiments of FIGS. 4B-4E may be interchanged or combined to realize any or all of the features described above with reference to FIGS. 4A-4E.

Referring to FIGS. 4A-4E, wireless power receiver client 400 can rectify power from one or more 5.8 GHz antennas 425. Wireless power receiver client 400 can include an application-specific integrated circuit (ASIC) (e.g., control logic 410) can have support for the external rectifier 451 and may also contain a separate rectifier (e.g., rectifier 449). The wireless power receiver client 400 can protect itself from RF input power levels above normal operation.

RF transceiver 420 and its constituent components (e.g., 435, 440) generates a low power beacon signal at 5.8 GHz which can use a simple on-off keying (OOK) protocol. The beacon power level and encoding will be based on an internal memory register contained, for example, in the control logic 410. The wireless power receiver client 400 may have a unique identifier (e.g., stored in client ID module 450) that can be used to uniquely identify it. This unique ID may be part of (e.g., encoded in) the beacon signal encoded by, e.g., beacon coding module 440, and transmitted by antenna(s) 425.

The rectified power harvested by wireless power receiver client 400 can input to a very low quiescent current, high efficiency synchronous buck-boost converter (e.g., one or more of first 489, second 492 and third 494 converters). The output from the converter(s) can charge a super capacitor or lithium ion battery energy storage device 415. The wireless power receiver client 400 can turn-on the system when an internal programmed value or resistor setting voltage is reached. Before this value is reached, the wireless power receiver client 400 can keep the system power supplies disabled until the super capacitor or lithium ion battery has enough power stored. A separate buck-boost converter (e.g., 492 and/or 494) can provide power to run the system (e.g., 472). This buck-boost converter (e.g., 492) can connect to the super capacitor or lithium ion battery energy storage device 415 and output a programmable voltage. One or more resistors or a factory programming will set this output voltage according to, for example the above described means. The output voltage can also be adjustable through an internal memory register (e.g., of control logic 410) or a digital input pin to change this voltage for a low power mode. The buck-boost converter (e.g., 492) can have three outputs which include one direct output, and at least two load switch 455 outputs to allow portions of the system 472 to be turned on and off to save power. The wireless power receiver client 400 can have an output signal to warn when the state-of-charge of the super capacitor or lithium ion battery energy storage device 415 is low. In some embodiments, the wireless power receiver client 400 can have an ultra-low current buck-boost converter (e.g., 494) to run an external real-time clock (RTC).

The wireless power receiver client 400 can have two beacon modes for transmission into wireless power transmission environment via antenna(s) 425: a timing beacon and a power beacon. Each of them can be utilized to facilitate power delivery and synchronous communication between the wireless power transmitter (WPT) and the wireless power receiver client (WPRC) 400. This can also allow for low power consumption at the wireless power receiver as transmission of its timing beacon consumes less power than side channel communication.

Generally speaking, the wireless power receiver client 400 is always in two modes: beacon (timing beacon/power beacon) and power harvesting mode. The WPT can have the capability to identify each fixed receiver by comparing two sets of information: phase set from the WPRC and specific bits extracted from the WPRC long ID which can be referred to as the most significant bits (MSBs). For example, the wireless power receiver client 400 full ID can have 128 bits, 8 of which are the MSBs. Key information to the WPT can be transmitted by the WPRC to communicate a status or a certain need.

The beacon transmission can be transmitted in either a synchronous fashion (scheduled CW and/or encoded beacon) or an asynchronous fashion. The asynchronous beacon can be broadcasted without a set schedule as described in U.S. patent application Ser. No. 15/852,216.

The simplified receiver architecture in the embodiments of the wireless power receiver client 400 described above with reference to FIGS. 4A-4E may rely on a timing acquisition module (TAM) as described in U.S. patent application Ser. No. 16/244,013.

The technology of the simplified wireless power receiver client 400 disclosed herein describes wireless power, data and beaconing transmissions. Persons having ordinary skill in the art will recognize and appreciate that the transmitters and receivers according to the disclosed technology can be configured to operate at one or more of various frequencies to enable these transmissions and/or other data transmissions. For example, the transmitters and receivers can be configured for operation in any ISM Band (2.4 GHz, 5.8 GHz, 24 GHz, etc.).

According to the present technology, the timing beacon operates at frequency 0 "0" for a certain duration (e.g., 10 ns). This can give the WPT the opportunity to shut off the power at the WPT antennas to allow for listening to the WPRC-broadcasted timing beacon. This beacon is sent at a short amount of time in relevance to the power beacon timing. The timing beacon can have a short ID (e.g., 8 bit beacon) can be extracted from the full receiver ID, "sometimes referred to as COTA ID" (128 bit beacon). If the WPT can receive this timing beacon for a first time, then the power can be sent for a certain duration (e.g., x microseconds). The wireless power receiver client 400 can check the amount of time it took for the power to be delivered. By this time, the wireless power receiver client 400 can have enough power to send the full code (128 bits) so that the WPT can check if it is a desired WPRC to be powered. The WPT now has the 8-bit code and the phase set of the WPRC (power beacon). As such, the WPT can thus verify which client it is interacting with. If the WPT receives a different phase set than expected, then it can verify that it isn't the desired WPRC. This works where the WPRC is stationary. For a moving WPRC, authentication can be performed with a different method based on the historic phase data and where it would predict to be traditionally. The WPT can kick off undesired receivers or detect faulty hardware/software at the WPRC or WPT.

As there is no need for the proxy (communication module), the WPT hardware can also simplified for use with the wireless power receiver client 400 according to the present technology. As compared to the known wireless power receiver client 300 of FIG. 3, the receiver hardware is simplified as described as well in FIGS. 4A-4E. The wireless power receiver client 400 can have only one antenna 425 for all its needs instead of multiple dedicated antennas as shown in FIG. 3. The rectifier(s) (449 and/or 451) in wireless power receiver client 400 can be a passive/active rectifier to harness directed and non-directed power at different frequencies. The wireless power receiver client 400 can have a power management module 445 responsible for managing the power received and supplied to the devices, including those of system 472. The WPT can use phase data in combination with the client ID (e.g., stored in client ID module 450) to identify the WPRC.

Figure 6:
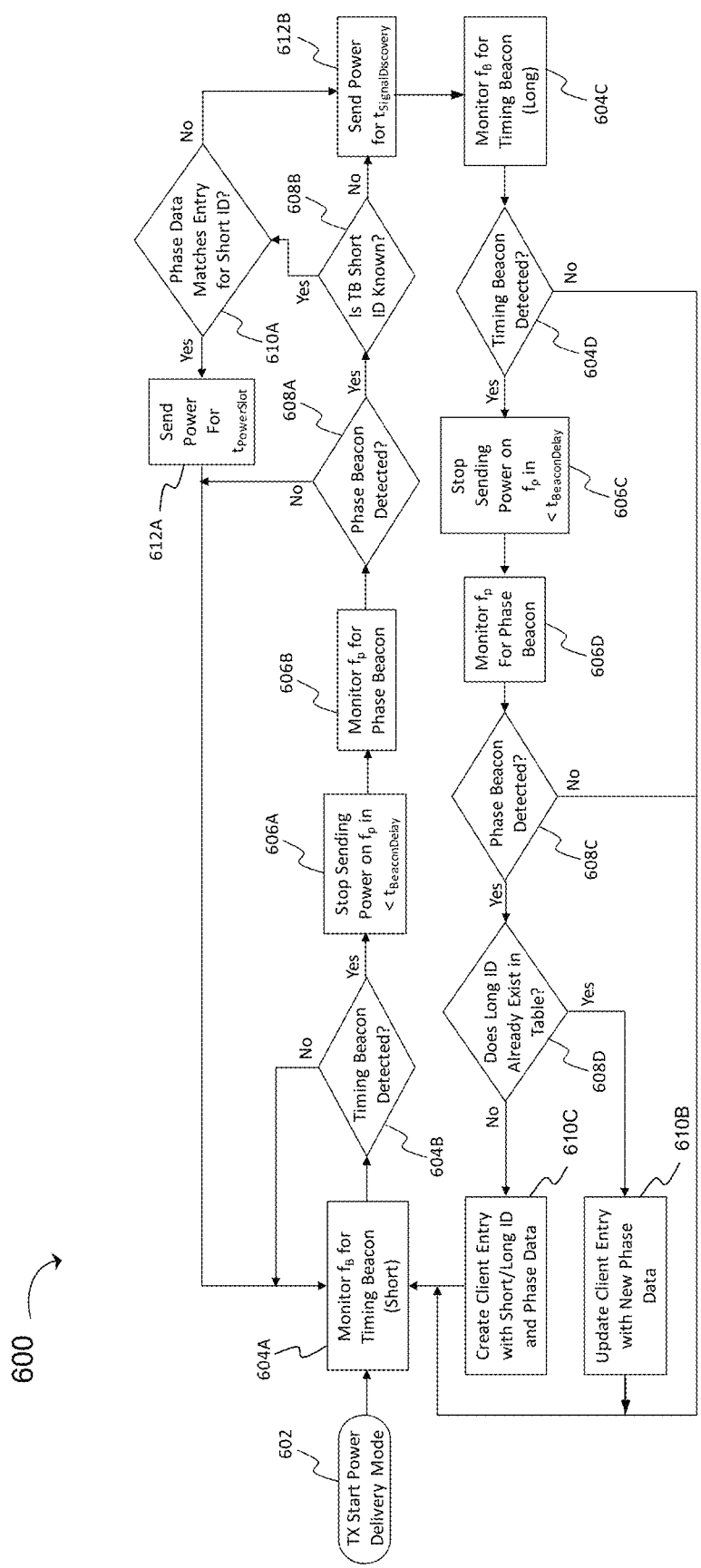
FIG. 6 depicts a flow chart of a beacon/power delivery process using the wireless power receiver client of FIGS. 4A-4E that does not rely on side channel communication, from the perspective of the wireless power transmitter, in accordance with some embodiments.
Figure 7:
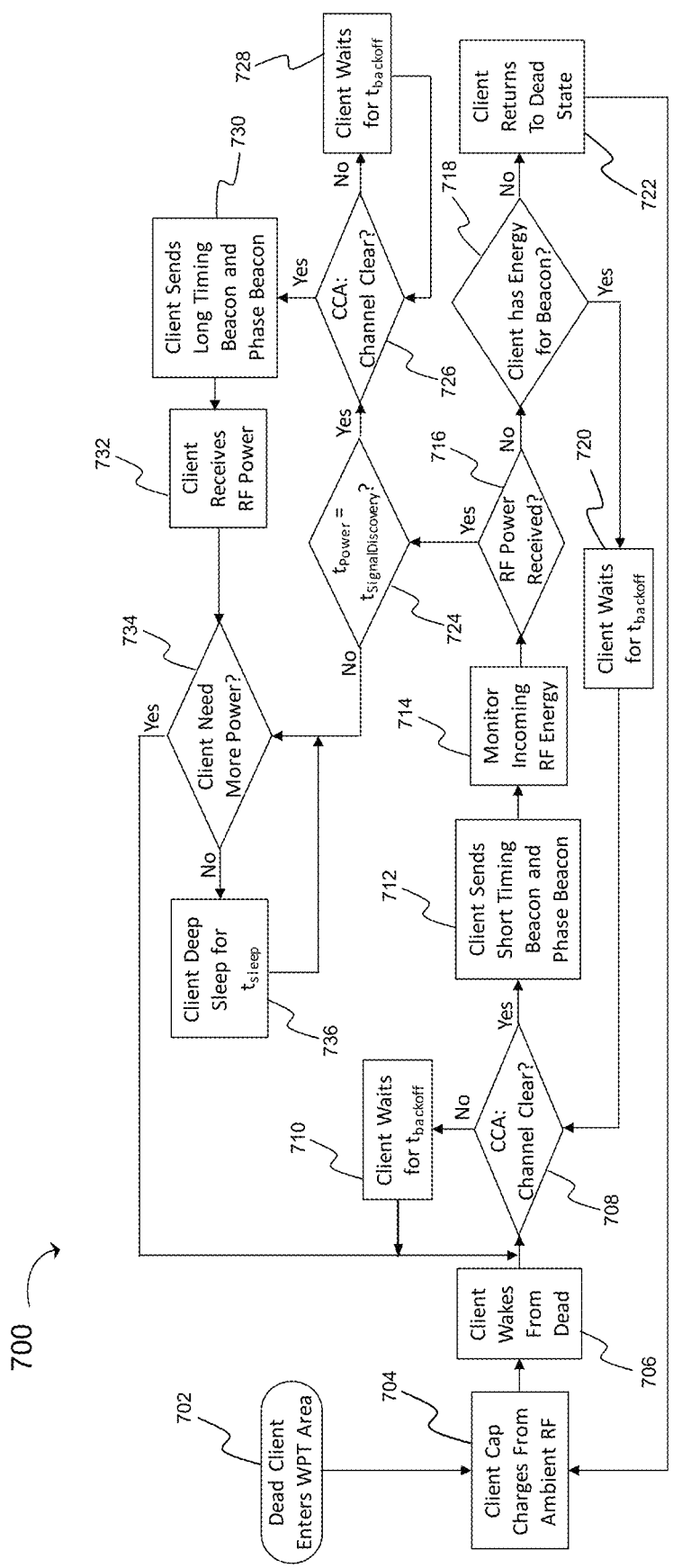
FIG. 7 depicts a flow chart of a beacon/power delivery process using the wireless power receiver client of FIGS. 4A-4E that does not rely on side channel communication, and from the perspective of the wireless power receiver, in accordance with some embodiments.

The two flow charts shown and described below with reference to FIGS. 6 and 7 provide details regarding how this simplified approach of wireless power receiver client 400 can operate. The duration of the power slot can be triggered to send specific amount of information (e.g., send me your battery level). In some embodiments, the power slot duration can be used to trigger either the information in the next beacon or to cause the client to take certain actions (e.g., to switch beacon frequency, etc.).

Figure 5A:
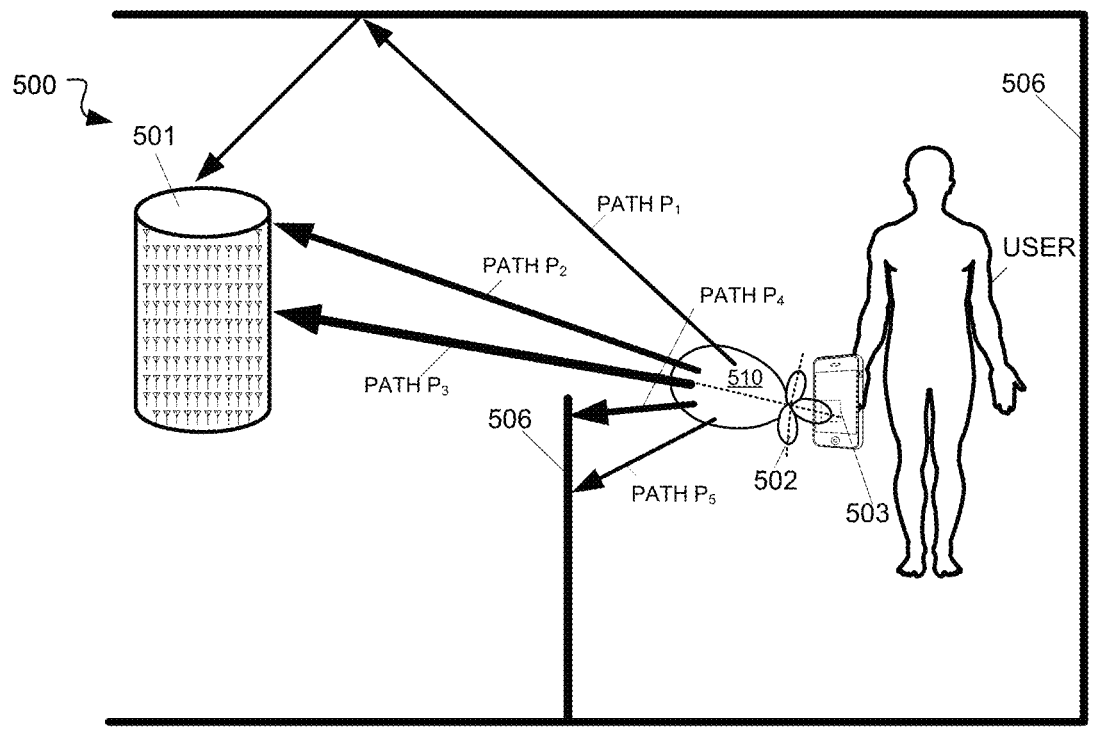
FIGS. 5A and 5B depict diagrams illustrating an example multipath wireless power delivery environment in accordance with some embodiments.
Figure 5B:
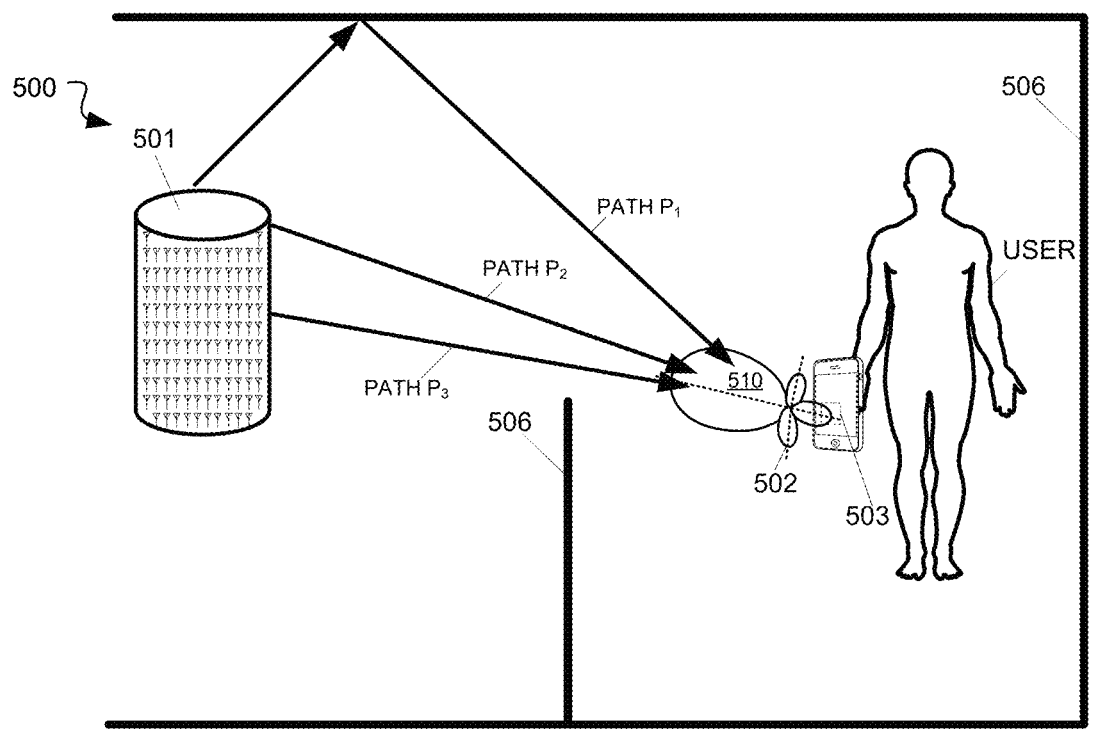

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIGS. 4A-4E, respectively, although alternative configurations are possible. Likewise, wireless power transmission system 501 can be wireless power transmission system 101 of FIG. 1, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 502. The one or more antennas (or transceivers) can be wholly or partially included as part of the wireless device 502 and/or the wireless power receiver client (not shown). For example, in some embodiments one or more antennas, e.g., WI-FI, BLUETOOTH, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., received signal strength indication (RSSI), depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transmit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment. Although the example of FIG. 5A illustrates transmitting a beacon (or calibration) signal in the direction of the radiation and reception pattern 510, it is appreciated that, in some embodiments, beacon signals can alternatively or additionally be omni-directionally transmitted.

FIG. 6 depicts a flow chart of a beacon/power delivery process 600 using the wireless power receiver client 400 of FIGS. 4A-4E that does not rely on side channel communication, and from the perspective of the WPT, according to an embodiment. Process 600 commences from a WPT application start power delivery mode 602 to operation 604A. In operation 604A, the TAM monitors the beacon frequency ($f_B$) for a short timing beacon signal. From operation 604A, process 600 proceeds to logic branch 604B, in which TAM determines whether the short timing beacon (TB) is detected. If TAM detects the short timing beacon (TB), then process 600 proceeds to operation 606A. In operation 606A, the WPT transceiver (XCVR) stops sending power on the power frequency ($f_p$) within an amount of time<$t_{BeaconDelay}$. This time period provides a short delay once the timing beacon is detected to allow the WPT time to stop sending power and get ready to receive the phase beacon. From operation 606A, process 600 proceeds to operation 606B, where XCVR monitors $f_p$ for the phase beacon.

From operation 606B, process 600 proceeds to logic branch 608A, in which an antenna matrix board (AMB) digital controller determines whether the phase beacon is detected. In an example, the AMB digital controller can be a field programmable gate array (FPGA). In other examples, the AMB digital controller can be a digital application-specific integrated circuit (ASIC), a microcontroller (MCU), or a digital signal processor (DSP), etc. If AMB digital controller detects the phase beacon, then process 600 proceeds to logic branch 608B, in which AMB digital controller determines whether the short TB ID is known. If AMB digital controller determines that short TB ID is known, then process 600 proceeds to logic branch 610A, in which a configuration control board (CCB) digital controller determines whether the phase data matches the data entry for the short TB ID. In an example, the CCB digital controller can be an FPGA. In other examples, the CCB digital controller can be a digital ASIC, an MCU, or a DSP, etc. If CCB digital control determines that the phase data matches the data entry for the short TB ID, then process 600 proceeds to operation 612A. In operation 612A, a real-time software (SW) directs the WPT to send power for an amount of time=$t_{PowerSlot}$. Process 600 then loops back to operation 604A. Process 600 also loops back to operation 604A if, in logic branch 604B or logic branch 608A, TAM determines the short TB is not detected, or AMB digital controller determines the phase beacon is not detected, respectively.

If, in logic branch 608B, AMB digital controller determines that the short TB ID is not known, then process 600 proceeds to operation 612B. Likewise, if CCB digital controller determines, in logic branch 610A, that the phase data does not match the data entry for the short TB ID, process 600 proceeds to operation 612B. In operation 612B, real-time SW sends power for an amount of time=$t_{SignalDiscovery}$. From operation 612B, process 600 proceeds to operation 604C. In operation 604C, TAM monitors $f_B$ for a timing beacon signal containing the long ID. From operation 604C, process 600 proceeds to logic branch 604D, in which TAM determines whether the long TB is detected. If TAM determines that the long TB is not detected, the process 600 loops back to operation 604A.

However, if TAM determines, in logic branch 604D, that the long TB is detected, then process 600 proceeds to operation 606C. In operation 606C, XCVR stops sending power on $f_p$ within an amount of time<$t_{BeaconDelay}$. From operation 606C, process 600 proceeds to operation 606D, where XCVR monitors $f_p$ for phase beacon. From operation 606D, process 600 proceeds to logical branch 608C, in which AMB digital controller determines whether the phase beacon is detected. If the phase beacon is not detected, the process 600 loops back to operation 604A. However, if AMB digital controller determines, in logical branch 608C, that the phase beacon is detected, then process 600 proceeds to logical branch 608D. In logical branch 608D, AMB digital controller determines whether the long TB ID matches a data entry (e.g., in a table).

If, in logical branch 608D, AMB digital controller determines that the long TB ID matches the data entry, then process 600 proceeds to operation 610B. In operation 610B, CCB digital controller updates the data entry with the new phase data for the wireless power receiver client 400. If, however, AMB digital controller determines that the long TB ID does not match the data entry, then process 600 proceeds to operation 610C. In operation 610C, CCB digital controller creates a data entry with the short and long ID and phase data for the wireless power receiver client 400. From operations 610B or 610C, process 600 loops back to operation 604A.

FIG. 7 depicts a flow chart of a beacon/power delivery process 700 using the wireless power receiver client 400 of FIGS. 4A-4E that does not rely on side channel communication, and from the perspective of the wireless power receiver, according to some embodiments. Process 700 commences from entry 702 of wireless power receiver client 400 for a device (e.g., smartphone) having a dead battery, and proceeds to an operation 704. In operation 704, energy storage device 415 (e.g., capacitor) of wireless power receiver client 400 is charged from the ambient RF in the wireless power transmission environment. From operation 704, process 700 proceeds to operation 706, in which the wireless power receiver client 400 wakes from "dead." In the context of the present technology, "dead" refers to a WPRC that was in a fully depleted charge state and which can harvest sufficient ambient energy to begin the focused power delivery cycle with the WPT. Next, process 700 proceeds from operation 706 to logical branch 708, in which a clear channel assessment (CCA) is performed to determine the RF medium is idle or not. If the channel is not clear, then process 700 proceeds to operation 710. In operation 710, the wireless power receiver client 400 waits for an amount of time=$t_{backoff}$, and then loops back to logical branch 708. If, however, wireless power receiver client 400 determines, in logical branch 708 that the channel is clear, then process 700 proceeds to operation 712.

In operation 712, the wireless power receiver client 400 sends the short TB and the phase beacon to the wireless power transmitter. Then, in operation 714, the wireless power receiver client 400 monitors for incoming RF energy from the wireless power transmitter. From operation 714, process 700 proceeds to logical branch 716, where wireless power receiver client 400 determines whether RF power is received. If it is determined that RF power is not received, then process 700 proceeds to logical branch 718, in which wireless power receiver client determines if sufficient energy storage is present for transmitting the beacon signal. If sufficient energy for the beacon is present in energy storage device 415, then process 700 proceeds to operation 720. In operation 720, wireless power receiver client 400 waits for an amount of time=$t_{backoff}$, and then process 700 loops back to logical branch 708. If, however, in logical branch 718, wireless power receiver client 400 determines that sufficient energy for the beacon transmission is not present in energy storage device 415, process 700 proceeds to operation 722 to return the wireless power receiver client 400 to the "dead" state. From operation 722, process 700 loops back to operation 704.

If, in logical branch 716, wireless power receiver client 400 determines that RF power is received, then process 700 proceeds to logical branch 724. In logical branch 724, wireless power receiver client 400 determines if an amount of time=$t_{power}$ equal to $t_{SignalDiscovery}$ has elapsed. If that amount of time has elapsed, then process 700 proceeds to logical branch 726, in which a CCA is performed to determine the RF medium is idle or not. If the channel is not clear, then process 700 proceeds to operation 728. In operation 728, wireless power receiver client 400 waits an amount of time=$t_{backoff}$. Then, process 700 loops back to logical branch 726.

If, however, in logical branch 726, a result of the CCA is that the channel is clear, then process 700 proceeds to operation 730. In operation 730, the wireless power receiver client 400 sends the long TB and the phase beacon to the wireless power transmitter. From operation 730, process 700 proceeds to operation 732, where the wireless power receiver client 400 receives RF power. From operation 732, process 700 proceeds to logical branch 734, in which wireless power receiver client 400 determines whether it needs more power. Likewise, process 700 proceeds to logical branch 734 where, in logical branch 724, wireless power receiver client 400 determines if an amount of time=$t_{power}$ equal to $t_{SignalDiscovery}$ has not elapsed. If, in logical branch 734, wireless power receiver client 400 determines that it does not need more power, then process proceeds to operation 736. In operation 736, the wireless power receiver client 400 enters a deep sleep state for an amount of time=$t_{sleep}$. Process 700 then loops back to logical branch 734. If, however, in logical branch 734, the wireless power receiver client 400 determines that it needs more power, process 700 loops back to logical branch 708.

Figure 8:
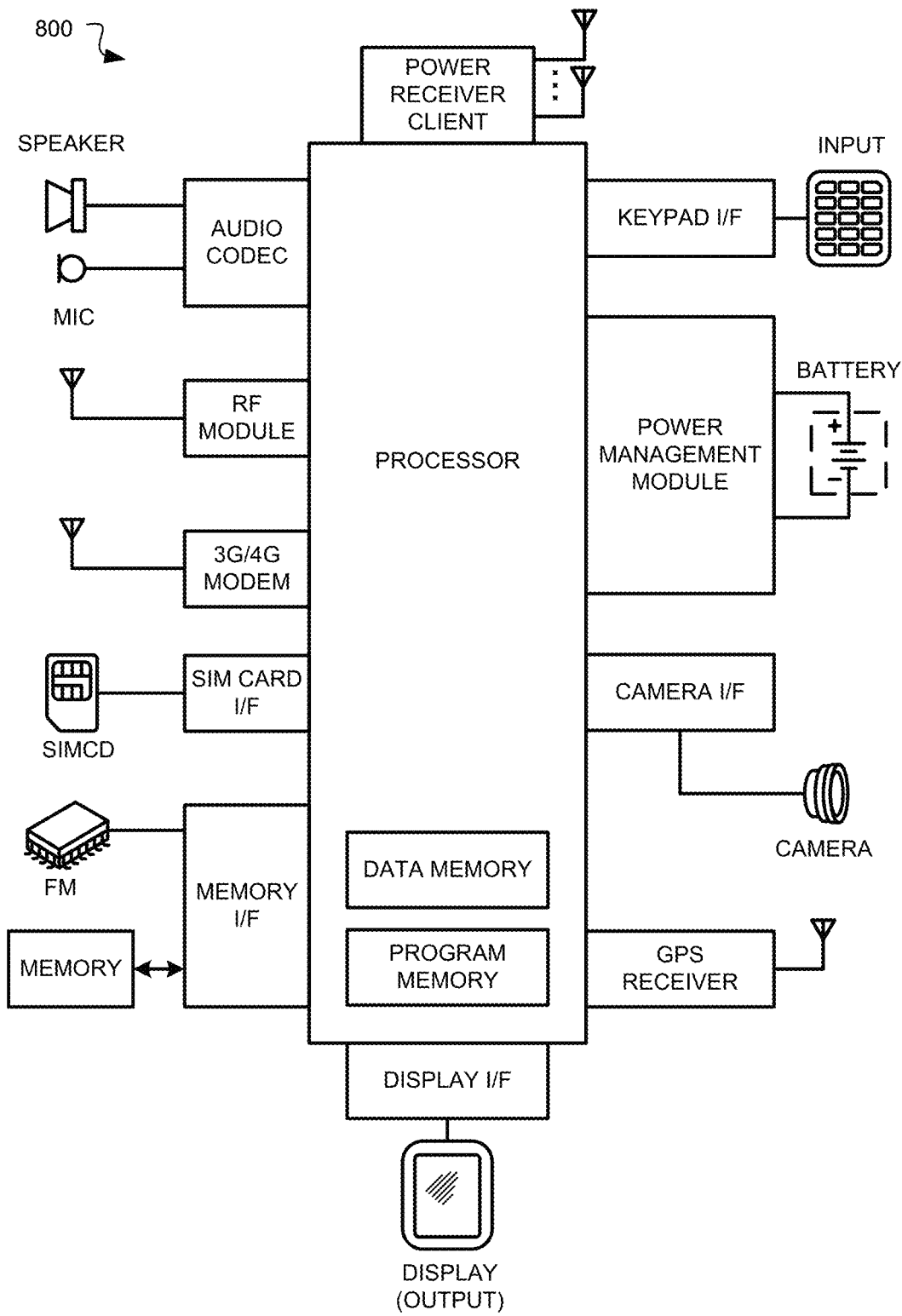
FIG. 8 depicts a block diagram illustrating example components of a representative mobile device or tablet computer with a wireless power receiver or client in accordance with some embodiments.

FIG. 8 depicts a block diagram illustrating example components of a representative mobile device or tablet computer 800 with a wireless power receiver or client in the form of a mobile (or smart) phone or tablet computer device, according to an embodiment. Various interfaces and modules are shown with reference to FIG. 8, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZIGBEE radios and RFID transceivers, along with antennas, can populate a printed circuit board (PCB).

The wireless power receiver client can be a power receiver client 103 of FIG. 1 or wireless power receiver client 400 of FIG. 4A, although alternative configurations are possible. Additionally, the wireless power receiver client can include one or more RF antennas for reception of power and/or data signals from a charger, e.g., charger 101 of FIG. 1.

Figure 9:
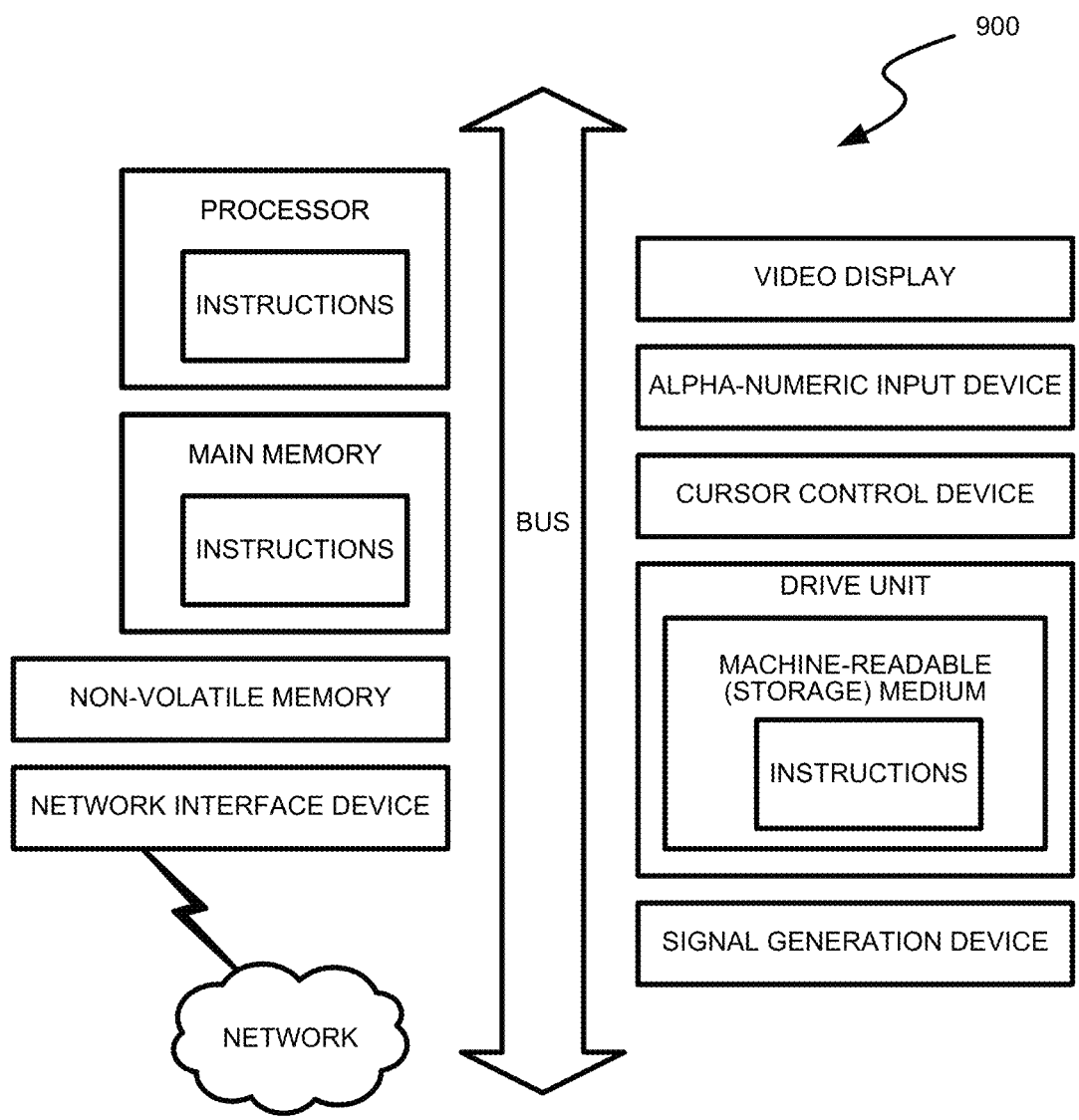
FIG. 9 depicts a diagrammatic representation of a machine, in the example form, of a computer system within which a set of instructions, for causing the machine to perform any one or more of the methodologies discussed herein, may be executed.

FIG. 9 depicts a diagrammatic representation of a machine, in the example form, of a computer system 900 within which a set of instructions, for causing the machine to perform any one or more of the methodologies discussed herein, may be executed.

In the example of FIG. 9, the computer system includes a processor, memory, non-volatile memory, and an interface device. Various common components (e.g., cache memory) are omitted for illustrative simplicity. The computer system 900 is intended to illustrate a hardware device on which any of the components depicted in the examples of FIG. 1 or 4A (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an INTEL PENTIUM microprocessor or MOTOROLA POWER PC microprocessor. One of skill in the relevant art will recognize that the terms "machine-readable (storage) medium" or "computer-readable (storage) medium" include any type of device that is accessible by the processor. In some embodiment, these storage media are embodied in non-transitory computer-readable media that can store program instructions (e.g., as software or firmware) which, when executed by one or more processors of the disclosed technology (e.g., control logic 410, power management module 445, system 472), cause the wireless power receiver client 400 to implement, execute, or otherwise facilitate performance of the various algorithms and methods disclosed herein.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as WINDOWS from MICROSOFT Corporation of Redmond, Washington, and their associated file management systems. Another example of operating system software with its associated file management system software is the LINUX operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an IPHONE, a BLACKBERRY, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above detailed description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above detailed description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above detailed description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium (any claims intended to be treated under 35 U.S.C. § 112(f) will begin with the words "means for"). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above detailed description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description section explicitly defines such terms. Accordingly, the actual scope of the invention encompasses not only the disclosed examples, but also all equivalent ways of practicing or implementing the invention.

What is claimed is:

1. A transceiver comprising a controller configured to:
   direct an antenna to transmit a first signal to another transceiver for a first duration to cause the another transceiver to enter a listening mode and decode first data encoded by the first signal using a first number of bits;
   in response to the first signal being transmitted, receive, via the antenna, a second signal from the another transceiver for a second duration greater than the first duration;
   in response to the second signal being received, direct the antenna to transmit a third signal to the another transceiver to cause the another transceiver to decode second data encoded by the third signal using a second number of bits greater than the first number of bits and uniquely identifying the transceiver in a wireless signaling environment.

2. The transceiver of claim 1, wherein the controller is further configured to:
   generate the first signal having the first data encoded therein; and
   generate the third signal having the second data encoded therein.

3. The transceiver of claim 2, wherein the controller is further configured to access at least one of the first data and the second data from a memory to facilitate at least one of the first signal and the second signal being generated.

4. The transceiver of claim 1, wherein to direct the antenna to transmit the first signal, the controller is configured to direct the antenna to transmit the first signal at a first frequency, and wherein the controller is further configured to:
   receive, via the antenna, the second signal for a third duration different from the second duration; and
   in response to the second signal being received for the third duration, direct the antenna to transmit the third signal at a second frequency different from the first frequency.

5. The transceiver of claim 1, wherein the controller is further configured to:
   receive, via the antenna, the second signal for a third duration different from the second duration; and
   in response to the second signal being received for the third duration, direct the antenna to transmit a fourth signal to the another transceiver encoding third data different from the first and the second data.

6. The transceiver of claim 5, wherein the third data includes data representative of a state or charging need of an energy storage device of or associated with the transceiver, and wherein the second signal is a wireless power signal capable of being used by the transceiver to charge the energy storage device.

7. The transceiver of claim 1, wherein the controller is further configured to measure the duration of the second signal.

8. The transceiver of claim 1, wherein the second signal is a wireless power signal capable of being used by the transceiver to charge an energy storage device of or associated with the transceiver, and wherein the controller is further configured to harvest electric energy from the second signal to provide the transceiver sufficient power for transmission of the third signal.

9. The transceiver of claim 1, wherein the controller is further configured to measure the duration of the second signal.

10. The transceiver of claim 1 further comprising the antenna operably coupled to the controller.

11. A method in a transceiver, the method comprising:
    transmitting a first signal to another transceiver for a first duration to cause the another transceiver to enter a listening mode and decode first data encoded by the first signal using a first number of bits;
    in response to transmitting the first signal, receiving a second signal from the another transceiver for a second duration greater than the first duration;
    in response to receiving the second signal, transmitting a third signal to the another transceiver to cause the another transceiver to decode second data encoded by the third signal using a second number of bits greater than the first number of bits and uniquely identifying the transceiver in a wireless signaling environment.

12. The method of claim 11, further comprising:
    generating the first signal having the first data encoded therein; and
    generating the third signal having the second data encoded therein.

13. The method of claim 12 further comprising accessing at least one of the first data and the second data from a memory to facilitate at least one of generating the first signal and generating the second signal.

14. The method of claim 11, wherein transmitting the first signal comprises transmitting the first signal at a first frequency, the method further comprising:
    receiving the second signal for a third duration different from the second duration; and
    in response to receiving the second signal for the third duration, transmitting the third signal at a second frequency different from the first frequency.

15. The method of claim 11 further comprising:
    receiving the second signal for a third duration different from the second duration; and
    in response to receiving the second signal for the third duration, transmitting a fourth signal to the another transceiver encoding third data different from the first and the second data.

16. The method of claim 15, wherein the third data includes data representative of a state or charging need of an energy storage device of the transceiver, and wherein the second signal is a wireless power signal capable of being used by the transceiver to charge the energy storage device.

17. The method of claim 11, wherein the second signal is a wireless power signal capable of being used by the transceiver to charge an energy storage device of or associated with the transceiver.

18. The method of claim 17 further comprising harvesting electric energy from the second signal to provide the transceiver sufficient power for transmitting the third signal.

19. The method of claim 11 further comprising measuring the duration of the second signal.

20. One or more non-transitory computer readable storage media having instructions stored therein which, when executed by at least one processor, cause a transceiver to:
  direct an antenna of the transceiver to transmit a first signal into a wireless signaling environment for a first duration to cause another transceiver to enter a listening mode and decode first data encoded by the first signal using a first number of bits;
  in response to the first signal being transmitted, receive, via the antenna, a second signal from the another transceiver for a second duration greater than the first duration;
  in response to the second signal being received, direct the antenna to transmit a third signal to the another transceiver to cause the another transceiver to decode second data encoded by the third signal using a second number of bits greater than the first number of bits and uniquely identifying the transceiver in a wireless signaling environment.

\* \* \* \* \*